Patented Feb. 2, 1937

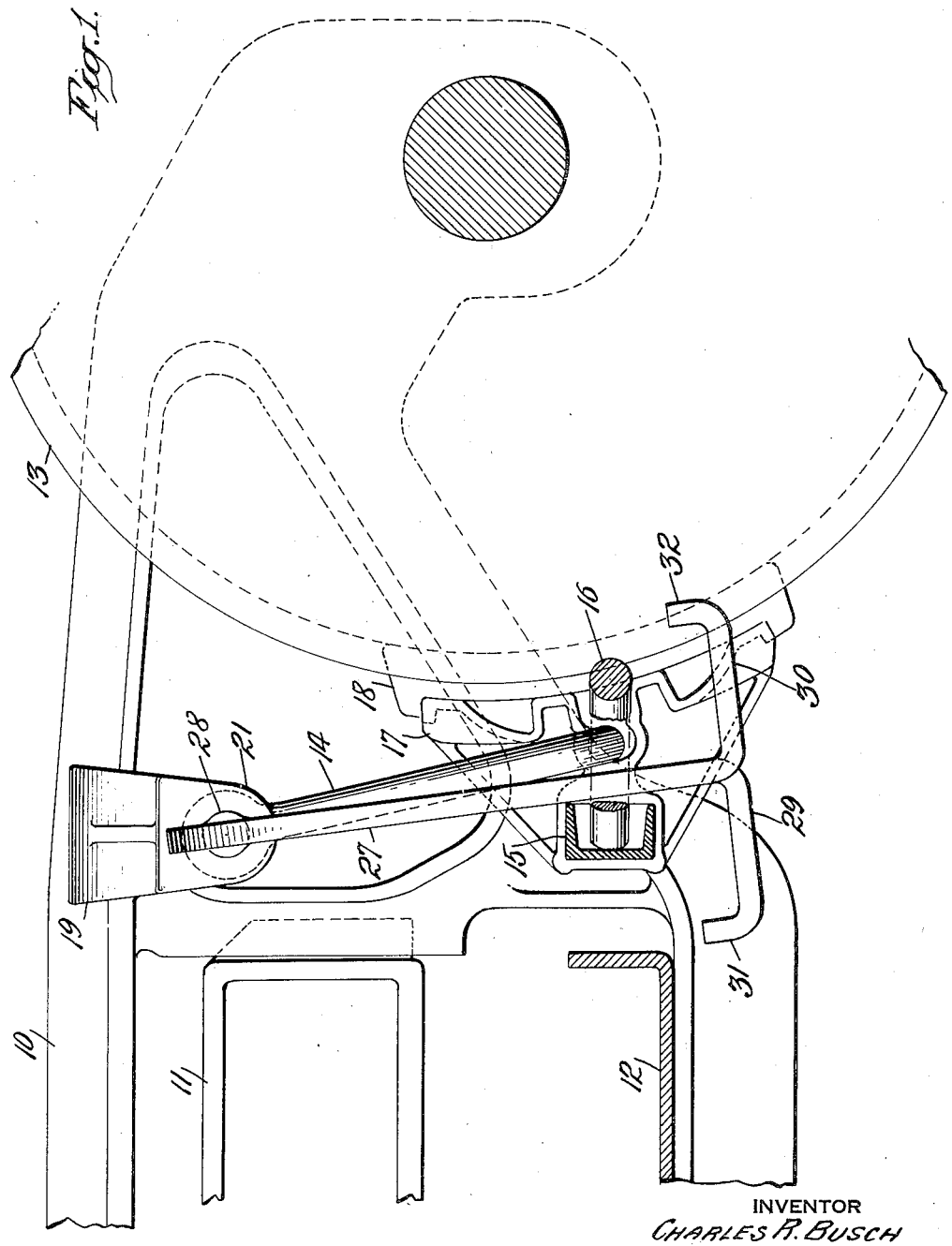

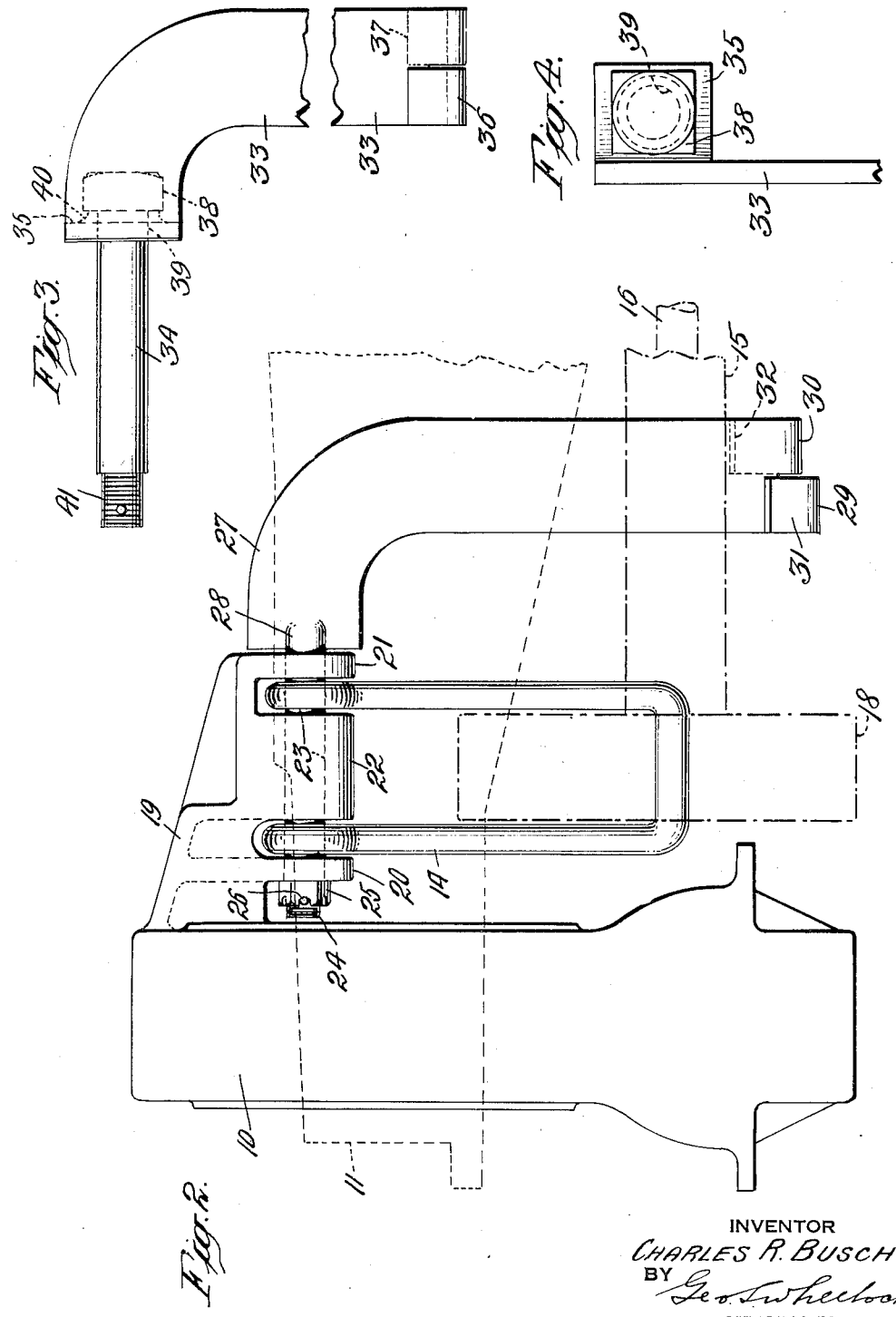

2,069,353

UNITED STATES PATENT OFFICE 2,069,353

SAFETY HANGER FOR BRAKE BEAMS

Charles R. Busch, Orange, N. J., assignor to Buffalo Brake Beam Company, New York, N. Y., a corporation of New York Application September 14, 1932, Serial No. 633,053

8 Claims. (Cl. 188—210)

The present invention relates to safety hangers for brake beams that can be applied directly to four or six wheel trucks of railway cars without the use of rivets, bolts, welding or other means of attachment, thereby saving the cost of such attachments, such hanger supporting the beam in its entirety, as in a cradle, providing positive safety in case of failure of any of the parts of the brake beam.

Among the objects of the present invention are to provide a safety suspending member which is pivotally supported from a side frame of the truck so as to extend beneath and support the brake beam in case of its failure; to provide means for supporting a brake hanger, which means also serves to support a safety hanger for the brake beam; to provide a safety support for both a brake hanger and the adjacent brake beam, which support includes a pivot in common with the brake hanger and the safety hanger for the brake beam; to provide a bracket for supporting a brake-hanger and to support the brake beam in case of failure of any of the brake parts; and to provide a safety hanger for brake beams which means includes a pivot for supporting both a brake hanger and as an emergency support in case of failure of any of the brake parts.

Other objects of the invention generally are to provide safety means for supporting a brake beam in case of its failure which means is of novel construction and is at the same time practical and efficient in use.

These being among the objects of the present invention, the same consists of certain features of construction and combinations of parts to be hereinafter described and then claimed with reference to the accompanying drawings illustrating preferred embodiments of the invention and wherein Fig. 1 is a broken or partial elevation of the principal elements of a car truck and side frame, as viewed from the inner side, the parts being shown in section, and illustrating one form of the present invention;

Fig. 2 is an end elevation of a car truck side frame showing the same parts as in Fig. 1, the elevation being partly in broken lines;

Fig. 3 is a broken elevation to illustrate a modified construction of safety hanger; and Fig. 4 is a broken elevation of the same as viewed from the right of Fig. 3.

Referring to Figs. 1 and 2 of the drawings, the principal members of a car truck side frame are illustrated. The side frame 10 itself is shown in connection with the truck-bolster 11. Below the bolster is the spring plank 12 and a portion of one of the truck wheels 13 is also shown. The brake hanger 14 supports the brake beam comprising the usual compression and tension members 15, 16, respectively, and it also supports the brake head 17 carrying the shoe 18.

A heavy cast bracket 19 extends inwardly from the side frame 10 in the position to support the brake hanger 14. This bracket 19 is preferably cast integrally with the side frame 10 so as to avoid the necessity of means for attaching the bracket to the side frame. The bracket 19 is of such construction and form as to impart the desired strength and rigidity thereto. It is provided at opposite ends with downward ears or lugs 20, 21 between which there is located a larger downward projection 22, the ears and the projection being cast integrally with the bracket 19 and being spaced suitable distances apart so as to receive the upper ends of the brake hanger 14 which is preferably formed from a suitable rod bent into U-shape, the lower end of the hanger passing through the brake shoe head 17 so that it may fulcrum thereon.

The brake hanger 14 is mounted so as to be swingable upon a heavy pin 24 which extends through the ears 20, 21 and the projection 22, these elements 20, 21 and 22 being formed as bearings for permitting a pivotal movement of the pin therein. That end of the pin 24 which is directly adjacent the side frame 10 is screw threaded so as to receive a nut 25 which is preferably castellated so as to be locked to the pin by a retaining element 26. The nut 25 prevents movement of the pin longitudinally in one direction while a hanger 27 at the other end of the pin 24 prevents its movement in opposite direction. As shown in Figs. 1 and 2, the hanger 27 is of elbow shape and it is formed integrally with the pivot pin 24.

This hanger 27 is supplementary to the brake hanger 14, both being carried by the same pin 24, and an inward extension 28 of the pin 24 merges with the adjacent upper end of hanger 27. In other words the longitudinal axis of the pivot pin 24 passes directly through the upper end of hanger 27, as well as through the hanger 14, so that both hangers 14 and 27 are supported directly by the pin 24 and may therefore swing upon the same axis in their own movements. The shank or long leg of the hanger 27 extends downwardly between the compression member 15 and the tension member 16 of the brake beam, said hanger being so mounted and constructed as to serve as an emergency or safety support for the brake beam in case of it or any part thereof dropping from its operative position. To this end the brake beam hanger 27 is provided at its lower end with oppositely extending foot elements 29 and 30. These foot elements are preferably formed integrally with the brake beam hanger 27 and are deflected therefrom in offset relation the one to the other, they serving as supporting stirrups. As viewed from the edge, the safety brake beam hanger presents the appearance of an inverted T. As an additional precaution the outer ends of the foot elements 29, 30 are preferably deflected upwardly to provide guards or lips 31, 32, respectively.

From the preceding description it will be understood that the brake hanger 14 and the safety brake beam hanger 27 make use of the same pivot pin 24, so that each may have an independent movement, the brake hanger 14 to be permitted its movement during application of the brake to the truck wheel 13 and the brake beam safety hanger 27 to be permitted such movement as may be necessary, inasmuch as it is independent of the brake beam, and it passes loosely between the compression and tension members of the beam and is controlled and restricted as to its swinging movements, by contact with said members, although it acts as a safety support in the event of the dropping of the beam or a part thereof. Hence the brake beam safety hanger 27 acts as a sort of cradle to receive the brake beam which has no connection therewith except insofar as the particular construction illustrates the shank of the hanger 27 passing between the compression and tension members of the brake beam.

A modification of the invention is illustrated in Figs. 3 and 4 wherein the brake beam safety hanger 33 constitutes one member and the pivot pin 34 an entirely separate member, although both of these are so combined as to reliably and firmly secure them together when in use. The safety hanger 33 is provided at its upper end with a flange 35, said flange being perforated so as to fit the pivot pin 34. The lower end of the safety hanger 33 is provided as previously referred to, with oppositely extending offset foot elements 36, 37 functioning for the same purposes as before mentioned. The pin 34 is provided with a head 38, which seats at the inner surface of the flange 35, the pin passing through the perforation 39 in the said flange. Preferably between the head 38 and the flange 35 there is positioned a suitable washer 40 which may be of a springy or yielding nature, and when a nut such as 25 above-mentioned is screwed upon the screw threaded portion 41 of the pin 34, the parts are held together in assembled relation upon a hanger bracket such as previously described.

It will be obvious to those skilled in the art that the invention as shown and described is susceptible to more or less modification without departing from the spirit of the invention as defined in the appended claims.

What I claim as new is,—

1. In combination with a rigid frame member of a car-truck, and a brake-beam, a safety suspending member in the form of an arm, and a pivot mounted on the frame and integral with the arm, the arm extending underneath and detached from the beam to support the beam in case it drops.

2. In combination with a rigid frame member of a car-truck, and a brake-beam, a safety suspending member movably supported from the frame and separate relatively laterally offset elements extending underneath the beam to support the beam in case it drops.

3. The combination with a rigid frame of a car-truck, and a pivot mounted thereon for supporting a brake hanger, of a safety hanger for a brake beam supported on the same pivot, the longitudinal axis of the pivot passing through the safety hanger itself so that such hanger may swing thereon as its center of movement.

4. The combination with a side frame of a car-truck, a bracket integral with the frame, and a pivot mounted on the bracket, of a brake hanger and a safety hanger for a brake beam, and means for mounting each hanger on the same pivot, the longitudinal axis of the pivot constituting a common axis for both hangers to swing on.

5. The combination with a side frame of a car-truck, a bracket integral with the frame, and a pivot mounted on the bracket, of a safety hanger for a brake beam mounted on the pivot, the hanger being of elbow shape, and the pivot extending away from and in line with the upper end of the hanger.

6. The combination with a side frame of a car-truck, a bracket integral with the frame, and a pivot mounted on the bracket, of a safety hanger for a brake beam mounted on the pivot, the safety hanger having foot elements for extending respectively under the tension and compression members of a brake beam.

7. The combination with a side frame of a car-truck and a bracket rigidly mounted on the side frame to extend inwardly therefrom, of a brake hanger and a safety hanger for a brake-beam, both hangers pivotally supported by the same pivots on the bracket, the longitudinal axis of the pivot constituting a common axis for the hangers to swing on and the safety hanger having a foot element extending underneath and independent of the beam to support the beam in case it drops.

8. The combination with a rigid frame member of a car truck and a brake beam supported therefrom and including a tension member and a compression member, of an arm constituting a safety suspending member pivotally mounted at its upper end upon the frame, such arm extending downwardly loosely between the said two members of the beam and also underneath the beam to support the beam in case it drops, the swinging movements of the arm relatively to the beam being controlled and limited by contact of the arm with the two members of the beam.

CHARLES R. BUSCH.